Patented July 7, 1931

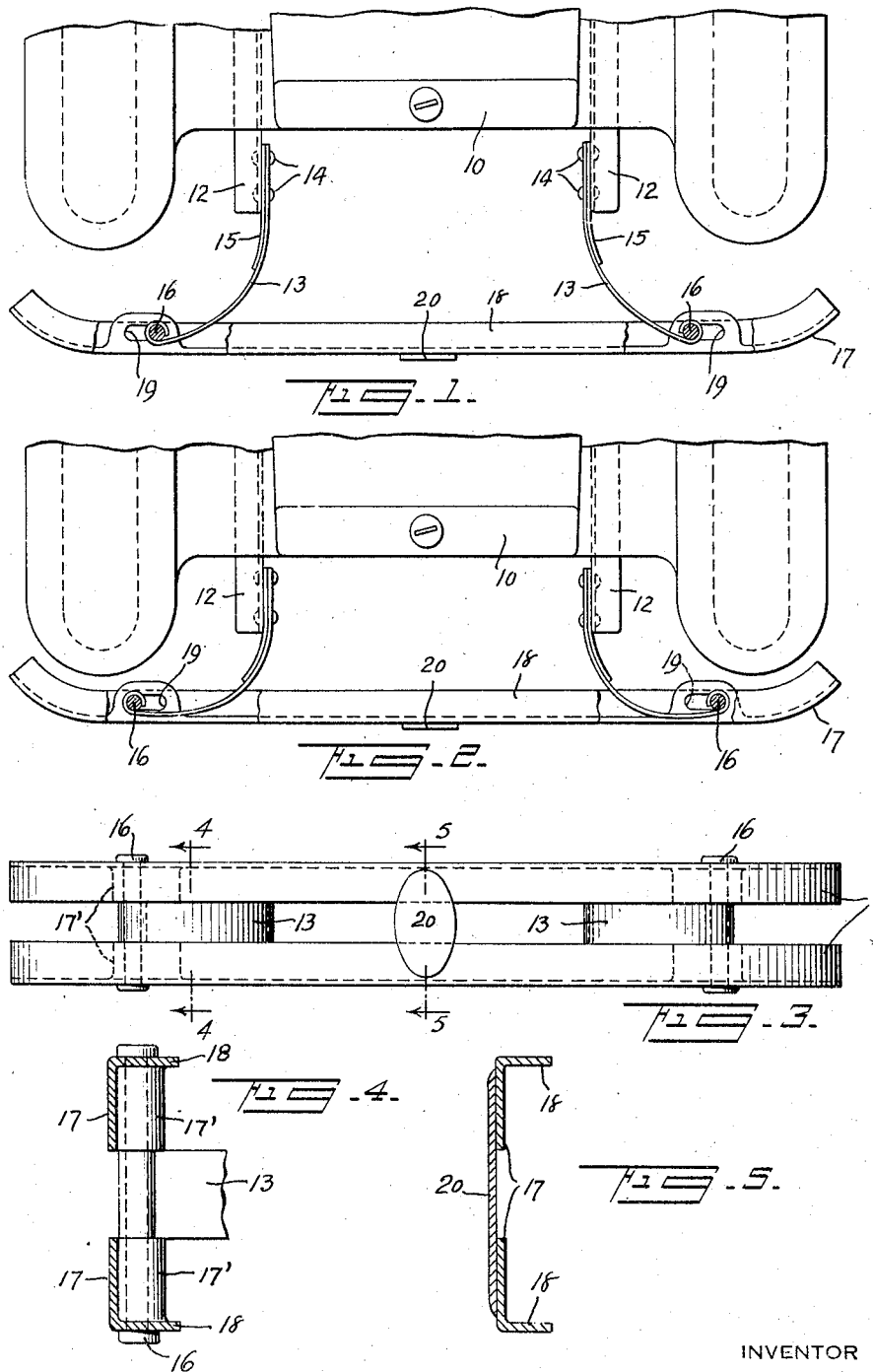

1,813,517

UNITED STATES PATENT OFFICE

ADOLPH A. THOMAS, OF NEW YORK, N. Y.

AUTOMOBILE BUMPER

Application filed May 28, 1930. Serial No. 456,368.

My invention is for an automobile bumper of novel construction and improved operation, comprising a pair of diverging spring arms which carry a bumper bar. The connection between these parts is such that the outer ends of the spring arms are forced apart when the bumper bar strikes an obstruction. This outward movement of the diverging spring arms increases their lateral tension and thereby absorbs or cushions the direct thrust of the collision. In other words, the head-on force of the impact is translated in a lateral direction and dissipated (in large part, at least) by increasing the divergence of the spring arms. Consequently, the car and its occupants are relieved of the direct shocks of collisions.

The practical advantages and novel features of my invention will be understood from a description of the accompanying drawings, in which—

Fig. 1 shows a plan view of my bumper attached to the front of an automobile, the parts being in normal position;

Fig. 2 is a view similar to Fig. 1, with the parts shown in position under the force of an impact;

Fig. 3 is a front view of the bumper; and

Figs. 4 and 5 are enlarged cross-sections on lines 4—4 and 5—5 of Fig. 3 respectively.

An automotive vehicle 10 has a pair of chassis extensions 12 which carry spring arms 13. These arms are preferably flat spring blades or leaf-springs secured at their inner ends to the extensions 12 by bolts or rivets 14, or in any other practical way. I may use supplemental spring blades 15 to re-enforce the spring arms 13 for increasing their resistance to sudden shocks. The fastening members 14 also secure the supplemental spring blades 15 to extensions 12.

The spring arms 13 diverge outwardly in a substantially continuous curve, and their free ends are coiled to support bolts or pins 16 to which a bumper bar 17 is connected. In the present instance, the bumper bar 17 comprises a pair of spaced angle irons having horizontal flanges 18 provided with longitudinal slots 19 for receiving the bolts 16. Additional contact surface for pins 16 is obtained by providing the bumper bar 17 with bushings 17' in line with slots 19. The spacing between the angle irons of bar 17 is slightly greater than the width of springs 13. The slots 19 are sufficiently long to permit outward movement of the diverging spring arms 13 under the force of an impact. The two angle irons of bumper bar 17 are rigidly secured together in any practical way, as by one or more cross-pieces 20, which may be welded or otherwise secured to the bar.

When the parts are in normal position, as shown in Fig. 1, the normal tension of spring arms 13 presses the pins 16 against the inner ends of slots 19, so that the bumper bar 17 is firmly supported against rattling. When the bumper bar strikes an obstruction and is suddenly pushed toward the car, the pins 16 slide outwardly in slots 19 and the tensioned spring arms 13 are forced apart at their free ends, so that their tension is increased. Since the normal distance between pins 16 is considerably greater than the distance between the supported ends of spring arms 13, the inward movement of bumper bar 17 in a collision exerts a leverage on the free ends of spring arms 13 and thereby forces them apart. Consequently, the head-on force of the impact spends itself in spreading the spring arms 13 farther apart, so that the direct shock is not transmitted to the car and its occupants. Putting this differently, I may say that a force acting upon the bumper bar 17 in the direction of the longitudinal axis of the car is translated in a direction crosswise of the car by increasing the tension of the diverging spring arms 13.

The re-enforcing spring blades 15 add considerable strength to spring arms 13 in resisting the outward movement of the latter. Of course, the spring arms 13 must not be too stiff, as otherwise they would act like rigid members and would not absorb the shock of a collision. On the other hand, the spring arms must not be made too weak, for they might then become permanently deformed under a heavy shock. The dimensions and elastic strength of spring arms 13 will naturally vary in bumper designs intended for cars of different sizes and weights, as will be understood by those skilled in this art.

Although I have shown and described a specific structure, I want it understood that my invention is not limited to the details set forth. Changes and modifications may be made without departing from the scope of the invention as defined in the appended claims.

I claim as my invention:

1. A bumper structure for automobiles comprising a pair of leaf springs secured at their inner ends to the chassis of the car and diverging outwardly in substantially continuous curves, a bumper bar, and means whereby the free ends of said springs are forced apart when said bar strikes an obstruction, said means including automatically adjustable connections between the bumper bar and said springs.

2. A bumper structure for automobiles comprising a pair of spring arms secured at their inner ends to the chassis of the car and diverging outwardly, a bumper bar connected to the free ends of said spring arms, and means permitting slidable movements of the free ends of said spring arms relative to the bumper bar, whereby the free ends of said spring arms are forced apart and increase the tension of the spring arms when the bumper bar strikes an obstruction.

3. A bumper structure for automobiles comprising a pair of spring arms secured at their inner ends to the chassis of the car and bent outwardly in continuously diverging curves, a bumper bar, a pin-and-slot connection between said bumper bar and the free ends of said spring arms, whereby said free ends are forced apart and increase the tension of the spring arms when the bumper bar strikes an obstruction.

4. A bumper structure for automobiles comprising a pair of spring arms secured at their inner ends to the chassis of the car and bent outwardly in continuously diverging curves, a bumper bar having a pair of lateral slots, and pins carried by the free ends of said spring arms and projecting through said slots, whereby the free ends of said spring arms slide outwardly in said slots to absorb the shock of an impact, the normal tension of said diverging spring arms holding said pins against the inner ends of said slots.

5. A bumper structure for automobiles comprising a pair of spring arms secured at their inner ends to the chassis of the car and bent outwardly in continuously diverging curves, a bumper bar comprising two spaced members arranged above and below said spring arms and provided with two pairs of lateral slots near their ends, the slots of each pair being vertically aligned, and pins carried by the free ends of said spring arms and projecting through said slots, whereby the free ends of said spring arms slide outwardly in said slots to absorb the shock of an impact, the normal tension of said diverging spring arms holding said pins against the inner ends of said slots.

6. A bumper structure for automobiles comprising a pair of flat spring arms secured at their inner ends to the chassis of the car and diverging outwardly at their free ends, a pair of flat spring blades secured at their inner ends to the chassis adjacent said spring arms, each spring blade being tensioned and arranged to press against the outer side of the adjacent arm, whereby said spring blades resist the outward movements of said spring arms and reinforce the same, a bumper bar connected to the free ends of said spring arms, and means permitting slidable movements of the free ends of said spring arms relative to the bumper bar, whereby the free ends of said spring arms are forced apart and increase the tension of the diverging arms when the bumper bar strikes an obstruction.

7. A bumper structure for automobiles comprising a pair of leaf springs rigidly secured at their inner ends to the chassis of the car, said leaf springs extending forwardly at their inner ends and diverging outwardly in substantially continuous curves, and a bumper bar so connected to the outer ends of said springs as to increase the normal distance between their outer ends when the bar strikes an obstruction, whereby said springs are tensioned to absorb the force of an impact.

8. A bumper structure for automobiles comprising a pair of flat spring arms secured at their inner ends to the chassis of the car and diverging outwardly at their free ends, a pair of flat spring blades secured at their inner ends to the chassis adjacent said spring arms, each spring blade being tensioned and arranged to press against the outer side of the adjacent arm, whereby said spring blades resist the outward movement of said spring arms and reinforce the same, and a bumper bar so connected to said springs as to increase the normal distance between their outer ends when the bar strikes an obstruction, whereby said springs and blades are tensioned to absorb the force of the impact.

9. As a new article of manufacture for bumper structures, an impact member consisting of two spaced bars each provided with an integral lateral flange, which flanges are slotted longitudinally of the bars, there being a pair of vertically aligned slots near each end of said member.

ADOLPH A. THOMAS.